United States Patent [19]

Wanneroy

[11] Patent Number: 4,905,607
[45] Date of Patent: Mar. 6, 1990

[54] DEFORMABLE FLOOR BETWEEN ADJACENT RAIL OR ROAD VEHICLES

[75] Inventor: Roland M. Wanneroy, Paris, France

[73] Assignee: Caoutchouc Manufacture et Plastiques, Versailles, France

[21] Appl. No.: 214,706

[22] Filed: Jul. 1, 1988

[30] Foreign Application Priority Data

Jul. 1, 1987 [FR] France ............................ 87 09360

[51] Int. Cl.⁴ ............................................ B61D 17/22
[52] U.S. Cl. ...................................... 105/8.1; 105/15; 280/403
[58] Field of Search ......................... 105/8.1, 15–20; 280/403

[56] References Cited

U.S. PATENT DOCUMENTS

| 3,410,226 | 11/1968 | Krupp | 105/18 X |
| 4,570,964 | 2/1986 | Tatay et al. | 280/403 |
| 4,599,947 | 7/1986 | Keefer | 105/15 |

FOREIGN PATENT DOCUMENTS

| 0134202 | 6/1984 | European Pat. Off. | |
| 0181294 | 2/1985 | European Pat. Off. | |
| 206910 | 12/1986 | European Pat. Off. | 105/8.1 |
| 2357409 | 12/1978 | France | |
| 2573714 | 11/1984 | France | |
| 709435 | 1/1980 | U.S.S.R. | 105/15 |
| 418422 | 10/1934 | United Kingdom | 280/403 |
| 598156 | 2/1948 | United Kingdom | 105/8.1 |

Primary Examiner—Margaret A. Focarino
Assistant Examiner—Dean J. Kramer
Attorney, Agent, or Firm—Nils H. Ljungman

[57] ABSTRACT

A deformable floor in an interconnecting compartment between two adjacent rail or road vehicles is capable of allowing relative movement between the adjacent vehicles and is capable of accommodating for differences in relative angular positioning of and linear distance between the adjacent vehicles. The deformable floor includes a pair of support shafts respectively located at opposite sides of the vehicles with each extending in a longitudinal direction generally between the adjacent vehicles. Each extended end of the support shaft is resiliently mounted relative to its respective vehicle for relative angular movement therebetween. A plurality of generally evenly spaced rigid transverse bars extends in a transverse direction between the support shafts. There is included a friction bearing at each end of each of the rigid transverse bars on the support shaft for relative longitudinal movement therebetween. Reinforcing material is folded about and adhering to each of the rigid transverse bars. An upper covering of elastomer material is bonded to the rigid transverse bars and the reinforcing material to provide a generally planar surface thereabove which is generally aligned between the floors of the adjacent vehicles. A lower covering of elastomer material is bonded to the reinforcing material at the lower region of the deformable floor.

22 Claims, 4 Drawing Sheets

FIG_1

DEFORMABLE FLOOR BETWEEN ADJACENT RAIL OR ROAD VEHICLES

BACKGROUND OF THE INVENTION

1. Field of the Invention:

This invention generally relates to connection devices between two adjacent rail vehicles, road vehicles or the like where the passenger traffic is made possible between the vehicles by the use of accordion vestibules or bridges which include protection from weather and noise. More specifically, this invention relates to a deformable device which permits vertical and/or horizontal relative movement between the floors of the adjacent vehicles. The deformable device is particularly advantageous when more than two of the vehicles are connected in a series, because many of the devices used in prior art are not applicable for such a configuration.

2. Description of the Prior Art:

Generally, the connection between the different vehicle or car bodies, in particular, those used in tramways, is made possible by pivotal movement around a vertical axis of some type of interconnecting compartment. The interconnecting compartment would include cylindrical walls, a relatively flat ceiling and a horizontal floor to provide physical continuity with each vehicle as it rotates around an axis which is perpendicular to its floor. The pivoting of the floor of each vehicle relative to the floor of the interconnecting compartment occurs along two circular arcs which slide one over the other.

French Pat. No. 2 357 409 describes one advantageous embodiment of such a mechanism. The two halves of the interconnecting compartment are connected to one another by a horizontal, transverse axis located near the floor. Such a configuration ensures the physical continuity of the floors from one vehicle to the other by means of a hinge at the horizontal transversal axis which is preferably located on the load bearing cross-member of a central bogey. The result is a "universal" type connection between the vehicles which allows relative movement about two generally parallel vertical axes and the horizontal, transverse axis therebetween. If the track is uneven, the rolling torsion must then be absorbed by the suspensions of the end bogeys. The disadvantages of this device is that it cannot be used, for mechanical reasons, on a train consisting of more than two cars which, for example, travel the warped and twisted tracks of urban and mountain railways.

European Pat. No. 0 134 202 describes another embodiment of an interconnecting compartment wherein the chassis of the adjacent vehicles have a single common pivot point. The interconnecting compartment, which is represented by two halves which each include a semi-circular floor, is oriented by a device which bisects the angle between the two cars. These two interconnecting compartment floors permit buckling movements between the floors of the adjacent vehicles, even if there are more than two of them in a series. Although not described in the cited document, continuity between the two floors of the interconnecting compartment will be maintained if they are connected by some type of elastically deformable floor.

European Pat. No. 0 181 294 discloses an interconnecting compartment in which the buckling of a rigid floor thereof is basically made possible by a diagonally extending, flexible axis.

French Pat. No. 2 573 714 discloses a deformable floor which is basically supported by transverse bars which are fixed at their opposite ends by means of articulated parallelograms. If such a floor is to accommodate enormous deflections, in particular, those resulting from shearing motions, between the vehicles to which it is secured, it must be very flexible, yet still quite strong. To be sufficiently strong, it would appear that such a floor would require additional support by additional transverse bars which would probably have to be extended through and thus fill the cells of the deformable floor which cells are essential to make deformation of the floor possible.

An analysis of the connection devices of the prior art indicates that there is a need for a load bearing, continuous floor for an interconnecting compartment between railway or road vehicles or cars. The floor should be capable of accommodating for misalignments caused by differences in operating levels of the vehicles, buckling motions between the vehicles and small changes in the connecting distance between the vehicles. Such a floor which can accommodate for these various types of misalignments might be applicable between any number of connection devices between vehicles. However, it would be particularly useful for a system which includes relative pivotal movement between the adjacent vehicles which occurs about two axes, each of which is generally perpendicular to the floor of its respective vehicles. Although the two axes would be generally parallel, during operation of the vehicle, the interconnecting compartment and the floor thereof would be subjected to differences in operating levels for the vehicles, buckling movements between their floors, and changing distances between the axes of rotation.

OBJECTS OF THE INVENTION

Accordingly, an object of the invention is to provide a floor for an interconnecting compartment which includes at least a deformable portion thereof to produce a continuous connection between the floors of the adjacent vehicles on either side of the interconnecting compartment.

Another object of the invention is to provide a deformable portion of the floor which would be capable of withstanding misalignments between the adjacent vehicles, whether used in conjunction with other vehicles or not, in spite of differences in operating levels, lateral rolling and/or buckling movements between the floors of vehicles.

SUMMARY OF THE INVENTION

The preferred deformable floor is located between rigid halves of the interconnecting compartment. The deformable floor comprises a thick, accordion-like wall, which includes an elastomer compound that is preferably produced by a pressure molding process frequently employed in the rubber transformation industry. The elastomer compound, including at least one reinforcing layer of textile cables, metal cables or short, oriented fibers, primarily encases a plurality of rigid bars which are oriented transversely to the direction of passage between the vehicles The rigid transverse bars are preferably essentially parallel to one another and regularly spaced as the opposite ends of each bar are respectively connected to a support shaft extending between the rigid halves of the interconnecting compartment.

One characteristic of the invention includes the thick wall which is made of reinforced elastomer compound being intimately bonded, by vulcanization, to the rigid transverse bars. The resulting device constitutes a one-piece deformable floor extending transversely across the middle of the interconnecting compartment.

Another characteristic of the invention resides in the mounting of the deformable floor on the support shafts at opposite sides of the interconnecting compartment. As a result, the support shafts support any load thereon by means of the rigid transverse bars, which are intimately bonded to the thick wall. With the ends of the rigid transverse bars mounted at the support shafts, each support shaft extends longitudinally and is located between the vehicles in a manner which allows the rigid transverse bars to move longitudinally on the support shafts.

This longitudinal movement of each end of the rigid transverse bars on their corresponding support shaft is preferably facilitated by mountings on the form of friction bearings which are capable of sliding along the support shaft. The friction bearings, comprising an internal anti-friction lining, are fixedly secured to the ends of the rigid transverse bars. The internal anti-friction lining closely encircles the support shaft which is, in turn, supported at its opposite ends respectively by some form of fastening frame at the floor of each half of the interconnecting compartment.

Another means of ensuring the desired longitudinal movement of the rigid transverse bars includes mounting their ends on the corresponding support shafts by means of deformable elastic bearings and equipping the ends of the support shafts with some type of sliding or elastic support.

It will be apparent from the present invention that it is possible to combine a sliding assembly and/or elastic supports which are capable of being resiliently deformed to allow for the desired relative longitudinal movement.

The preferred and alternative embodiments include various deformable floors which are capable of providing support with the desired movement of the ends of the rigid transverse bars on sliding bearings, deformable bearings, or other forms of simple supports. The support should be capable of allowing small dynamic movements in the longitudinal and/or angular direction between the rigid halves of the interconnecting compartment. As a result, the rigid halves of the interconnecting compartment can be respectively joined to an adjacent vehicle for relative pivotal movement therebetween about an axis which is perpendicular to the floor of the adjacent vehicle. The support will thus allow the relative movement between the halves of the interconnecting compartment that results from normal operation as the adjacent vehicles move in a straight line or around curves or experience a change of direction between one curve and a curve in the opposite direction.

In summing up, one aspect of the invention resides broadly in a deformable floor for being disposed between adjacent end frame arrangements of two adjacent rail or road vehicles at the floors thereof, the deformable floor for allowing relative movement between the adjacent end frame arrangements and also for accommodating differences in relative angular positioning of and linear distances between the adjacent end frame arrangements, the deformable floor comprising:

a support shaft arrangement, comprising at least one shaft, extending in a longitudinal direction generally between the adjacent end frame arrangements;

a plurality of spaced rigid transverse members extending transversely of the longitudinal direction;

arrangement for mounting the support shaft arrangement to the adjacent end frame arrangements to provide relative angular movement therebetween;

arrangement for supporting each of the rigid transverse members on the support shaft arrangement to provide relative longitudinal movement therebetween; and deformable material being disposed between the rigid transverse members.

Another aspect of the invention resides broadly in a deformable floor for being disposed between adjacent end frame arrangements of two adjacent rail or road vehicles at the floors thereof, the deformable floor for allowing relative movement between the adjacent end frame arrangements and also for accommodating differences in relative angular positioning of and linear distances between the adjacent end frame arrangements, the deformable floor comprising:

support shaft arrangement extending in a longitudinal direction generally between the adjacent end frame arrangements;

a plurality of spaced rigid transverse members extending transversely of the longitudinal direction;

arrangement for mounting the support shaft arrangement to the adjacent end frame arrangements to provide relative angular movement therebetween;

arrangement for supporting each of the rigid transverse members on the support shaft arrangement to provide relative longitudinal movement therebetween;

reinforcing material being disposed about and adhering to each of the rigid transverse members;

an upper covering of elastomer material being disposed on the rigid transverse members and the reinforcing material to provide a generally planar surface thereabove which is generally alignable between the floors of the adjacent vehicles and a lower covering of elastomer material being disposed on the reinforcing material.

Yet another aspect of the invention resides broadly in a deformable floor for being disposed between adjacent end frame arrangements of two adjacent rail or road vehicles at the floors thereof, the deformable floor for allowing relative movement between the adjacent end frame arrangements and also for accommodating differences in relative angular positioning of and linear distances between the adjacent end frame arrangements, the deformable floor comprising:

at least two of support shafts;

each of the support shafts being located at opposite sides of the adjacent end frame arrangements;

each of the support shafts having extended ends and extending in a longitudinal direction generally between the adjacent end frame arrangements;

a plurality of spaced rigid transverse bars;

each of the rigid transverse bars extending in a transverse direction between the support shafts;

arrangement for resiliently mounting each extended end of the support shafts to the adjacent end frame arrangements to provide relative angular movement therebetween;

arrangement for supporting each end of at least some of the rigid transverse bars on the support shafts to provide relative longitudinal movement between each end of at least some of the rigid transverse bars and the support shafts;

reinforcing material being disposed about and adhering to each of the rigid transverse bars;

an upper covering of elastomer material being disposed on rigid transverse bars and the reinforcing material to provide a generally planar surface thereabove which is generally alignable between the floors of the adjacent vehicles; and a lower covering of elastomer material being disposed on the reinforcing material.

BRIEF DESCRIPTION OF THE DRAWINGS

The preferred characteristics and alternative features of the invention are described in greater detail below, with reference to the accompanying drawings.

DESCRIPTION OF THE PREFERRED EMBODIMENTS

Figure 1:
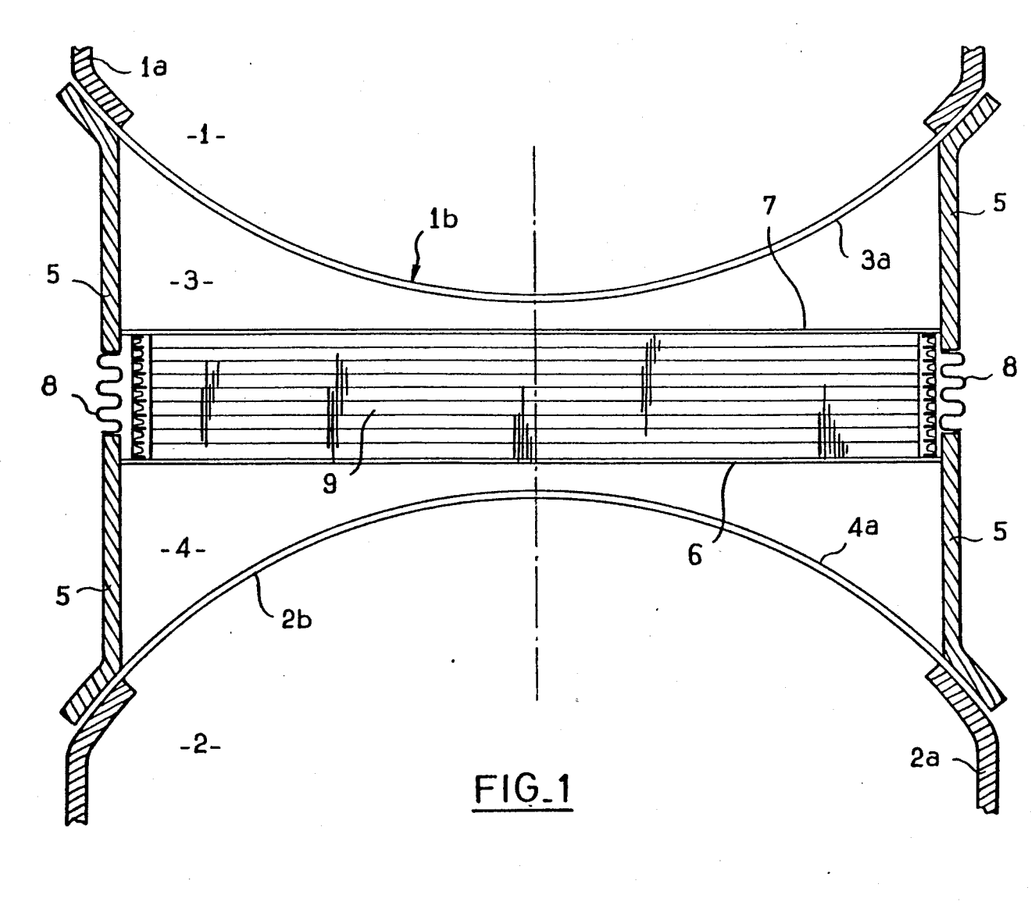
FIG. 1 is a simplified plan view of the preferred deformable floor showing its position between two adjacent vehicles.

FIG. 1 is a plan view of the floor area between two adjacent vehicles or parts of vehicles which has been simplified by the omission of the side seats or the covers which would normally be employed to ensure the continuity of the linings.

Vehicles 1 and 2 are shown to include their respective side walls 1a and 2a and floors which are respectively defined by circular arcs 1b and 2b. Although the two adjacent vehicles 1,2 are shown in FIG. 1, it should be clear that a similar configuration could be employed utilizing two adjacent cars of a railway train or even two relatively rotating halves of one vehicle.

Between the adjacent ends of the adjacent vehicles 1,2, there is shown an interconnecting compartment which basically includes two rigid portions or halves 3,4 and a deformable floor 9 therebetween. The interconnecting compartment includes sidewalls 5 which are joined with an appropriate flexible joint 8 in the region of the deformable floor 9 in a manner which is well known in the vehicle art.

Basically, in the preferred vehicle configuration employing the deformable floor 9 of an embodiment of the invention, the interconnecting compartment is located between adjacent vehicles 1,2 in a manner which allows each of the vehicles 1,2 to rotate relative to the interconnecting compartment. Specifically, the rigid portion or half 3, as generally indicated by an arc 3a is capable of rotating relative to the adjacent end of the vehicle 1 about an axis or center of rotation (not shown) which is perpendicular to the floor of the vehicle 1. Similarly, the rigid portion or half 4 is capable of rotation, as generally indicated by an arc 4a, relative to the adjacent end of the vehicle 2 about an axis or center of rotation (not shown) which is generally perpendicular to the floor of the vehicle 2. With such a preferred configuration, the linear distance between the axis or center of rotation on the vehicle 1 and the axis or center of rotation on the vehicle 2 remains relatively constant so that the interconnecting compartment remains in a position between the adjacent ends of the adjacent vehicles 1,2. The continuity of the floors of the vehicle 1 and the rigid portion 3 of the interconnecting compartment is maintained by the rotation of the arc 3a as it slides, for example, along the arc 1b of the end of the vehicle 1. Similarly, the continuity of the floors between the vehicle 2 and the rigid half 4 of the interconnecting compartment is maintained by the rotation of the arc 4a sliding along the arc 2b.

Accordingly, the rigid portions 3,4 of the interconnecting compartment are each generally maintained in a position relative to the axis or center of rotation of their respective vehicles 1,2. Further, the coupling (not shown) of the adjacent vehicles 1,2 would tend to maintain the axes or centers of rotation parallel one to the other and at a predetermined distance apart. As a practical matter, however, during operation of the vehicles 1,2, there is sufficient independent movement of each of the vehicles 1,2 to permit their respective axes to move so as not to remain absolutely parallel to one another or to maintain the exactly same distance therebetween.

The relative movement between the axes or centers of rotation of the vehicles 1,2 results from differences in operating levels, buckling movements, and small dynamic variations of the length of the coupling between the vehicles 1,2. The relative movement between the axes or centers of rotation causes generally corresponding relative movement between the rigid portions 3,4 of the interconnecting compartment. To compensate for this relative movement, the flexible joint 8 provides for the continuity of the side walls 5 of the rigid portions 3,4, and the deformable floor 9 is fixedly secured between the respective adjacent edges 6,7 of the rigid portions 3,4 to establish continuity between the floors of the rigid portions 3,4 of the interconnecting compartment.

In this preferred configuration for coupling the adjacent ends of adjacent vehicles or cars, the deformable floor 9 is specifically located between the adjacent edges 6,7 of the rigid portions 3,4 of the interconnecting compartment. However, it should be realized from the description of the preferred deformable floor 9 and alternative embodiments thereof as discussed hereinbelow that a similar deformable floor might be employed between adjacent edges of other types of interconnecting compartments or the ends of other types of vehicles or cars. In other words, although the preferred configuration for coupling the vehicles 1,2, which employs an interconnecting compartment as described above, is particularly attractive, other forms of connecting or coupling of vehicles or cars may equally employ a deformable floor of the invention independent of the particular type of coupling or connecting used between the vehicles or cars. Accordingly, in the detailed discussion of the preferred embodiment of the deformable floor 9 hereinbelow, reference may be made to the deformable floor 9 being coupled to the adjacent ends of the adjacent vehicles rather than specifically to the edges 6,7 of the rigid portions 3,4 of the interconnecting compartment. It should be clear, in fact, that the rigid portions 3,4 are generally more closely associated with and related to their respective vehicles 1,2 than they are to each other. Consequently, any reference to the maintenance of continuity between the floors of the adjacent vehicles should be interpreted as including, for this preferred coupling configuration, the floors of the rigid portions 3,4 of the interconnecting compartment.

Figure 2A:
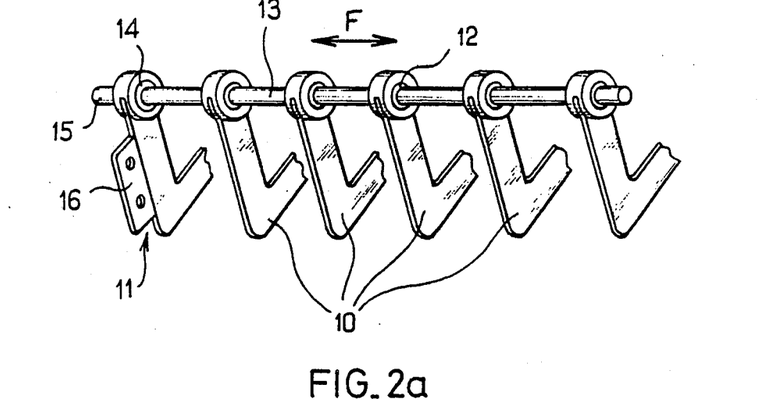
FIG. 2a is a fragmentary perspective view illustrating a preferred manner of supporting the deformable floor.
Figure 2B:
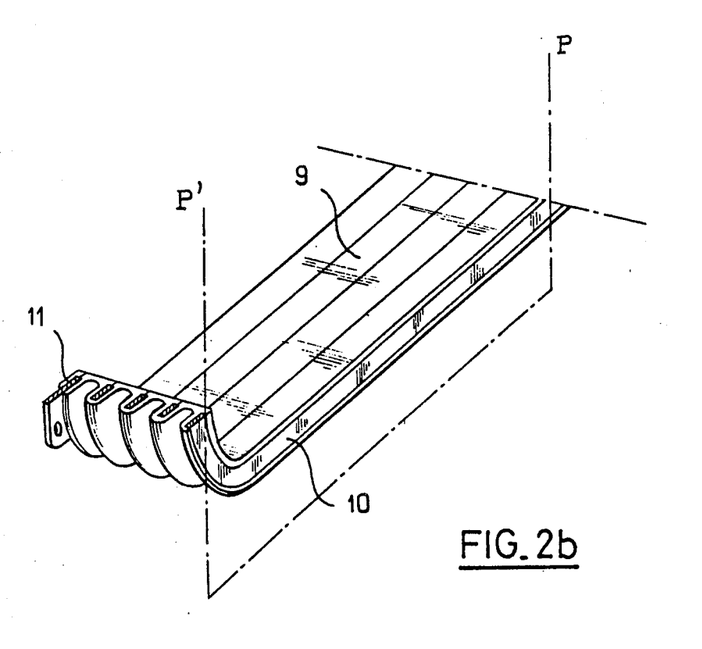
FIG. 2b is a fragmentary perspective view of the preferred deformable floor including various features of the invention.

As generally shown in FIGS. 2a and 2b the preferred deformable floor 9 includes a plurality of rigid transverse bars 10 which are supported at their opposite ends by respective support shafts 13. Accordingly, any load on the deformable floor 9 is basically supported by the plurality of rigid transverse bars 10 which are in turn supported at their opposite ends by a support shaft 13. The support shafts 13 extend generally longitudinally of the vehicles between the adjacent ends thereof in the region of the floors of the vehicles. Of course, specifically, for the preferred vehicles coupling configuration, the support shafts 13 would be mounted to the adjacent edges 6,7 of the rigid portions 3,4.

FIG. 2a generally illustrates a preferred manner of supporting the deformable floor 9 which makes possible the longitudinal and/or angular deflection or deformation of the deformable floor 9 as it extends between the vehicles 1,2. Specifically, the rigid transverse bars 10, the number of which can vary from two to approximately ten, are mounted so that the ends thereof are capable of sliding along the support shafts 13. Accordingly, each end of each of the rigid transverse bars 10 is preferably mounted on its respective support shaft 13 by means of a friction bearing 12. Each friction bearing 12 may be secured, for example, within a housing which is welded to the end of each of the rigid transverse bars 10. Each support shaft 13 may be made of solid or tubular steel and includes a smooth exterior surface which is closely received within the center opening of each of the support bearings 12.

Figure 4:
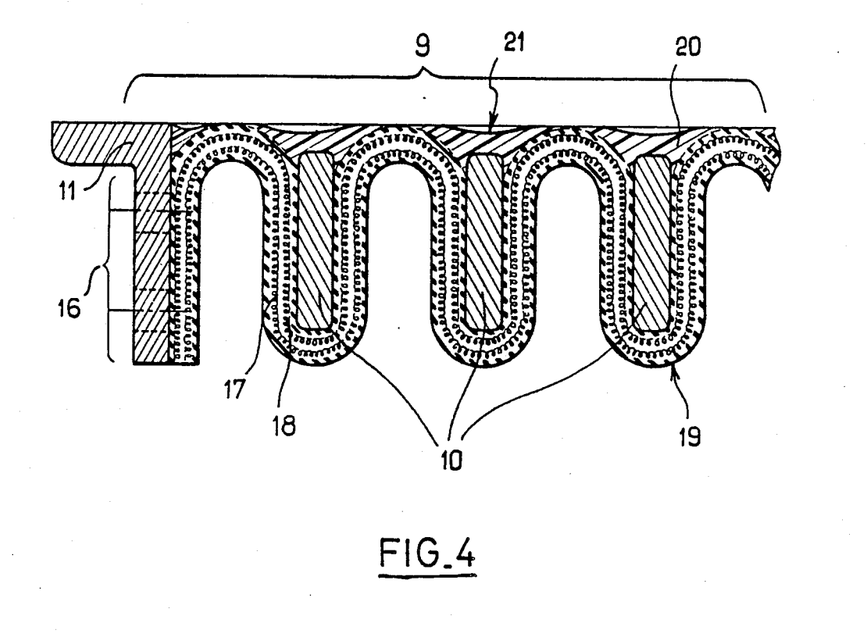
FIG. 4 is a fragmentary sectional view of the deformable floor of FIGS. 1, 2 and 3 including various features of the invention.

In order to better demonstrate the preferred manner of supporting the deformable floor 9, as seen in FIGS. 2b and 4, the preferred deformable floor 9 includes a means for generally encasing the rigid transverse bars 10 or joining one to the other by the use of a resiliently deformable material which will be discussed in detail hereinbelow. The resulting integral formation of the deformable floor 9 will be seen to cause the rigid transverse bars 10 to assume an equilibrium position, generally spaced one from the other while they retain the ability to move in either one direction or the other as shown by the double arrow F. The general movement along the support shafts 13 can occur in spite of vertical loading on the deformable floor 9 because of the low coefficient of friction of the interior surface of the opening in the friction bearings 12.

To basically support the ends of each of the support shafts 13 relative to the ends of the vehicles 1,2 (specifically, in the preferred vehicle coupling configuration, the adjacent edges 6,7 of the rigid portions 3,4 of the interconnecting compartment), the ends of the deformable floor 9 adjacent the ends of the vehicles 1,2 are provided with fastening frames 11. Specifically, the preferred fastening frames 11 are used to join the deformable floor 9 to vertical framing at the ends of the floors of the adjacent vehicles. Each fastening frame 11 may have a general shape similar to that of the rigid transverse bars 10 and will be equipped with brackets or plates 16 for bolting to the vertical framing. In the preferred embodiment of FIGS. 2a, 2b, and 4, the fastening frames 11 will also be equipped with end friction bearings 14 for the receipt of the extended ends of the support shafts 13 therein. The end friction bearings 14 are preferably reinforced because they support the support shafts 13 and will therefore bear the entire load on the plurality of rigid transverse bars 10.

With the preferred deformable floor 9 mounted in this manner, any relative movement between the ends of the vehicles 1, 2 will produce required deflection or deformation of the deformable floor 9 which will, in turn, cause the rigid transverse bars 10 to generally move relative to the fastening frames 11 at the ends of the deformable floor 9. The general movement of each of the rigid transverse bars 10 is made possible by and, in turn, generally produces angular deflection and movement of the support shafts 13 at each end thereof. Accordingly, each of the end friction bearings 14, with the support shaft 13 extending therethrough, may be subjected to greater relative angular movement of the support shaft 13, in spite of the load thereon, than the friction bearings 12.

Because of the relative angular movement of the support shaft 13 within the friction bearings 12 and the end friction bearings 14, each of the friction bearings 12,14 preferably includes an elastic ring material generally surrounding an interior sleeve to allow for angular deformation resulting from the relative angular movement of the support shaft 13. The interior sleeve is formed of a material having a relatively low coefficient of friction at least at the interior surface of the opening surrounding the support shaft 13. Because the end friction bearings 14 may be subjected to greater relative angular movement therein, the elastic ring material is configured to ensure that it is capable of greater deformation than would be required for the elastic ring material of the friction bearings 12.

As thus described, it should be clear that the opposite sides of the deformable floor 9 (generally represented by the ends of the rigid transverse bars 10 and the support shafts 13 therefor) would not only be subjected to angular deflection, but would also be subjected to compression and/or expansion. Specifically, the corresponding ends of the fastening frames 11 would be closer together during compression and would be further apart during expansion of the deformable floor 9. With each of the support shafts 13 being received within the array of friction bearings 12,14, there would be nothing to prevent the support shaft 13 from being withdrawn from the interior of one or more of the friction bearings 12,14. Accordingly, to limit the possible relative movement of the support shaft 13 in the preferred deformable floor 9 of FIGS. 2a, 2b, and 4, the smooth support shaft 13 is generally maintained in position by one, non-sliding bearing (not shown) similar to a friction bearing 12 positioned on the end of one of the rigid transverse bars 10. In other words, by providing a non-sliding bearing in the central region of the support shaft 13, the support shaft 13 will be maintained in a position relative to the entire deformable floor 9 in a manner which will facilitate relative movement of the friction bearings 12,14 thereon without allowing the support shaft 13 to slip out from the interior of any of the friction bearings 12,14. Such a non-sliding bearing would preferably be employed, for configurations of the deformable floor 9 which utilize an odd number of rigid transverse bars 10, on the central rigid transverse bar 10. However, it should be kept in mind, that even though the interior of the non-sliding bearing would prevent relative axial movement of the support shaft 13 therein, some angular movement would still be expected. Accordingly, such a non-sliding bearing would preferably include the elastic ring material similar to that employed in an embodiment of the friction bearings 12,14. If the overall configuration of the deformable floor 9 included an even number of rigid transverse bars 10, it would be appropriate to include in the center of each of the support shafts 13 some form of collar or extended boss (not shown) to limit the axial movement of the support shaft 13 relative to the overall deformable floor 9.

Although there would be some means provided to limit the axial movement of the support shafts 13 relative to the overall deformable floor 9, there must still be provided a means for insuring that the ends thereof will remain within the end friction bearings during all ranges of maximum compression and maximum expansion. Accordingly, each terminal end 15 of the support shaft 13 would normally extend beyond its corresponding end friction bearing 14 to provide an overall length for the support shaft 13 which will ensure its retention within the end friction bearings 14 throughout the range of compression and expansion.

Having explained the general means for bearing a load on the deformable floor 9 by the use of the rigid transverse bars 10, the support shafts 13, and the fastening frames 11, it is appropriate to discuss the means for providing the overall configuration of the deformable floor 9. As best shown in FIGS. 2b and 4, the preferred deformable floor 9 provides a walking surface for the passengers of the vehicles and also in the floor region protects the interior of the vehicles from weather and noise.

FIG. 2b shows how the deformable floor 9 is provided with overall rigidity by the inclusion of the rigid transverse bars 10 in the manner as shown in the sectional plane PP'. As better seen in FIG. 2a, the ends of the rigid transverse bars 10, and thus the sides of the deformable floor 9, are curved upwardly above the walking surface of the deformable floor 9. At the ends of the deformable floor 9 adjacent the vehicles 1, 2, there is included the fastening frames 11 which are directly secured to the ends of the vehicles at the floors thereof.

As seen in FIG. 4, the preferred deformable floor 9, is formed by pressure molding under conditions which are customary in the rubber transformation industry. The rigid transverse bars 10 may be made of metal, homogeneous polymers or rigid composites. During formation of the deformable floor 9, the rigid transverse bars 10 are treated and are coated with appropriate adhesives to ensure a close chemical bond and adherence with the adjacent elastomer compound during vulcanization of the entire deformable floor.

Homogeneous polymers for the rigid transverse bars 10 could include polymer materials composed of a matrix without a reinforcement material therein. The matrices are generally composed of industrial polymers, thermoplastic polymers, and/or thermo-setting polymers. The industrial polymers may include:
polyamide 6
polyamide 6—6
polyamide 11
polyamide 6-10
The thermoplastic polymers may include:
polybutylene terephtalate (PBT)
polyethylene terephtalate (PETP)
polyoxymethylene (POM)
polyfluorethylene propylene (FEP)
vinylidene polyfluoride (PVDF)
vinylidene polychloride (PVDC)
polypropylene (PP)
The thermo-setting polymers may include:
polyester resins
epoxy resins
urea-formaldehyde resins
melamine base resins
formaldehyde-phenol resins Rigid composites for the rigid transverse bars 10 would include the materials consisting of a matrix (such as those polymers listed above) which comprise a reinforcement material in the form of a reinforcing charge, for example, silica or carbon black, or in the form of short fibers (those less than 20 millimeters long), or continuous fibers or fiber matrix or woven fabrics. Such textile reinforcements are preferably selected from among the following:
polyamide fibers
aromatic polyamide fibers such as those sold under the trademark KEVLAR
polyester fibers
metal wires or cables
glass fibers
carbon fibers
boron fibers.

There are various adhesive bonding treatments which could be employed to ensure adherence of the elastomer compound to the rigid transverse bars. For example, a degreasing and phosphate treatment, or an electrochemical treatment (electrophoresis, cataphoresis or anaphoresis) would be appropriate for metal bars. However, no treatment or a chemical or mechanical surface treatment would be employed for bars made of a homogeneous polymer or composite. The adhesives, for example, consist of a primary layer and an adhesive such as that sold under the trademark CHEMOSIL for adherence of the metal bars. A solution of rubber in a solvent or an aqueous dispersion of thermocondensable resin (for example, a formaldehyde-phenol resin) and latex of an elastomer is employed for the adherence of the polymer bars. It would also be possible to use standard cyano-acrylate adhesives in such cases.

Figures 5A, 5B:
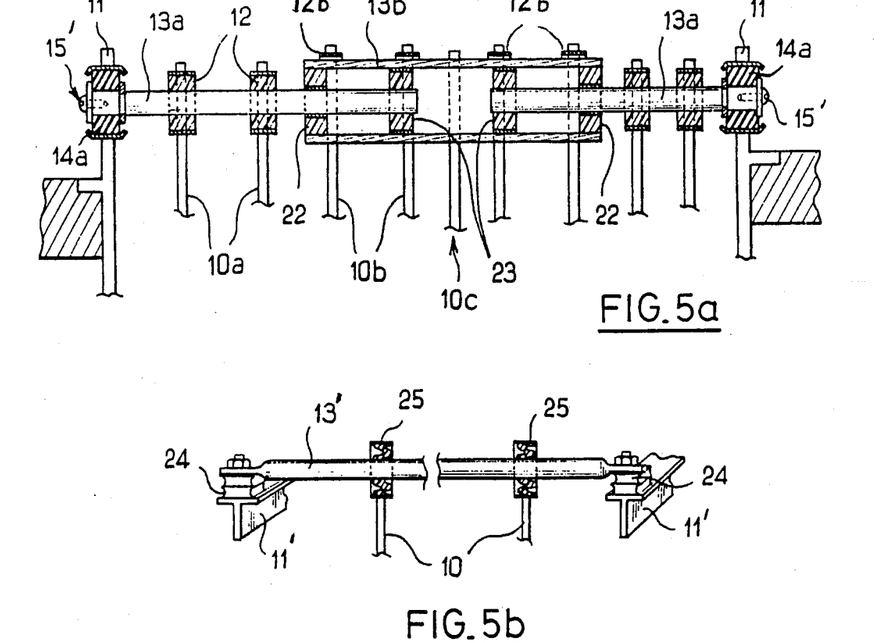
FIG. 5a is a fragmentary view partially in section of an alternative means for supporting a deformable floor.
FIG. 5b is a fragmentary perspective view partially in section of still another alternative means for supporting a deformable floor.

The rigid transverse bars 10 may, for example, be flat bar stock with the ends being curved by forging or other means to assume a general shape corresponding to the embodiment as shown in FIG. 2a. The fastening frames 11 may be formed in a similar manner but may also be equipped, for example, with a support bracket extending outwardly as shown in FIGS. 4 and 5a. The support bracket could be configured to rest on the end framing of the adjacent vehicle to prevent the entire load from being directed to the fastening bolts of the plates 16. The rigid transverse bars 10 and/or fastening frames 11 can also be made of homogeneous or composite polymer materials which have a sufficient mechanical strength and can be shaped as desired by molding.

In addition to the rigid transverse bars 10 and the fastening frames 11, the deformable floor 9 preferably includes two reinforcing or reinforcement elements 17, 18, although in an alternative embodiment only one such reinforcement element might be employed. Each of the reinforcement elements 17, 18 is preferably formed of textile cables having a high modulus, for example, a high modulus of rupture. Alternatively, the reinforcement elements can include aramid or metal cables, but may include other forms of cable with similar characteristics. As seen in FIG. 4, the reinforcement elements 17, 18 are basically formed in folds about the rigid transverse bars 10 and should the textile or other cables thereof being obliquely oriented with respect to each other in a crossed fashion, so that they are generally symmetrical with respect to the longitudinal direction between and the transverse direction across the vehicles. Basically, the reinforcement elements 17,18 will be maintained in position relative to the rigid transverse bars 10 by their being coated with an elastomer compound of an appropriate formulation. Such coatings of the reinforcement elements are most frequently adhesives, solutions of rubber in a solvent, elastomer latexes or an aqueous dispersion of thermosetting resin (for example, formaldehyde-phenol resin or ureaformaldehyde) and latex. As a result, during the molding of the deformable floor, the reinforcement elements 17, 18 cover the surfaces of the rigid transverse bars 10 and of the two fastening frames 11. The tight chemical bond created at the contact areas during vulcanization ensures that they will be held in place within the deformable floor 9.

Formation of the deformable floor 9 in this manner results in the lower portion thereof being formed in an accordion fashion. A covering 19 of this lower portion is formed of an elastomer compound to protect the deformable floor 9 from weather or from grease and dust resulting from the operation of the vehicle. Additionally, the particular elastomer compound may be further improved to include a fire resistant characteristic.

One possible method of forming the deformable floor 9 of the type described includes the use of a mold having the general accordion shape. The reinforcement elements 17,18 would be placed within the mold in contact with the rigid transverse bars 10 and the fastening frames 11. The mold would include lateral extremities which are shaped to provide the curved ends of the embodiment shown in FIGS. 2a and 2b. An upper covering 21 would also be formed of an elastomer compound to provide the upper surface of the deformable floor 9. The upper covering 21 can be formed, if necessary, by applying a sufficient amount of an elastomer compound to produce wedge-shaped regions 20 above the rigid transverse bars 10. The wedge-shaped regions 20 of the elastomer compound improve the adherence between the rigid transverse bars 10 and the reinforcement elements 17,18. During molding, the upper covering 21 can be given a design or a sculpture in relief which is appropriate for use as a non-slip floor. The upper covering 21 can preferably be made from an elastomer compound which has characteristics including a high resistance to abrasion, to washing and to surface aging and may also be fire resistant.

The base materials of the elastomer compounds of the coverings 19, 21, will preferably include elastomers having chlorine or bromine atoms in their molecular chain. Without specifically limiting which elastomers may be employed, some examples include, polychloroprene, butyl chlorinated rubber, butyl brominated rubber, or even chlorinated polyethylene. The formulations of these elastomer compounds can obviously be altered by the addition of filler, including antioxidation and/or vulcanizing agents, to the covering 19, 21.

For coverings 19,21 the typical elastomer compound consists of:

synthetic elastomer 100 parts by weight
anti-oxidizing additives 2 to 7 parts by weight
plastifier 3 to 100 parts by weight
powder reinforcing charge 0 to 100 parts by weight
reticulation agent 3 to 15 parts by weight In addition, the elastomer compound can include a reinforcing agent consisting of short fibers such as those listed above for inclusion within the rigid composite material of the rigid transverse bars 10.

The synthetic elastomer, for fire resistance, is preferentially selected from among the halogenated elastomers, such as:

polychloroprene
butyl chlorinated rubber
brominated butyl rubber
chlorinated polyethylene
a copolymer of isoprene and halogenated isobutylene (chlorinated or brominated)
or a mixture of these elastomers.

The system of anti-oxidation additives will be of the conventional type used in the rubber transformation industry. They will be composed, for example, of aromatic amines alone or in association with other components.

The system of plastifiers generally includes at least one paraffin, naphthenic or aromatic oil which may be combined with a wax or another plastifier.

The powder reinforcement charge will be preferably selected from the vast range of carbon blacks or light-colored charges such as silica.

The reticulating system of the elastomer must be appropriate to the nature of the elastomer, and generally consists of zinc oxide, stearic acid, one (or more) accelerators, and a reticulation agent. Other reticulation systems, such as those with organic peroxide bases, can also be used.

The elastomer compound can also include an adherence promoting system, of the RFS type, intended to cause, for example, by a continuous process, adhesion - in situ - between the fibrous reinforcement and the elastomer compound and/or between the elastomer matrix compound and a textile or metal reinforcement of the article to be fabricated.

The following compound is an example of a formulation on a synthetic elastomer base, polychloroprene, with a conventional reticulation system composed of magnesia, stearic acid and zinc oxide, The system of plastifiers is comprised of naphthenic oil, and the powder reinforcing charge is carbon black.

The composition by weight is as follows:

| COMPONENTS | PROPORTIONS BY WEIGHT |
|---|---|
| Sulfur-modified polychloroprene | 100.00 |
| Stearic acid | 0.50 |
| Zinc oxide | 5.00 |
| Magnesium oxide | 4.00 |
| Ethylene thiourea | 0.60 |
| Anti-oxidants | 2.50 |
| Naphthenic oil | 10.00 |
| HAF Black | 50.00 |
| Lead oxide | 20.00 |

Most frequently, the coverings 19,20 are made of the same elastomer compound. Nevertheless, they can consist of two compounds which may differ in terms of the basic elastomer or the type of powder charges. In a preferred embodiment, the lower covering 19 will be made of the compound which has the greatest resistance to weathering, while the upper covering 20 will be made of the compound which has the greater resistance to fire and wear.

In one alternative embodiment, the multi-layered material constituting the déformable floor 9 would still be basically formed to include the reinforcement elements 17,18 and the coverings 19,21 which are made of one or more elastomer compounds. However, it would also include the superposition of intersecting folds of anisotropic elastomers reinforced with short, oriented fibers during the calendering operation. In such an embodiment, the shaping of the sides to produce the configuration of the deformable floor 9 of FIGS. 2a and 2b would result in an "improper" orientation of the fibers in the vicinity of the sides if the fibers were really needed in this area for reinforcement. However, the curved sides of the deformable floor 9 primarily serve to seal the floor area rather than acting as a major load bearing region, since these parts then only act as seal members, and do not bear any load.

An example of an elastomer compound reinforced with short fibers can be obtained by adding from 10 to 50 parts of fibers to the compound given above as specific examples for use in the coverings 19,20. The fiber reinforcement may consist of natural, artificial or synthetic metal or textile fibers, the lengths of which do not exceed 20 millimeters. The textile fibers most frequently used are cotton or silk for the natural fibers; fibrane or regenerated cellulose for artificial fibers; and polyamide, polyester, aramide, polyacrylonitrile, polyvinyl alcohol or polyolefins for the synthetic fibers. To obtain a very high modulus, such as the modulus of elasticity, it is also possible to use glass, metal, boron or carbon fibers. Anisotropy is obtained by orientation of the fibers during passage between calender rolls during manufacture. The anisotropy ratio, the tensile strength in the direction of the reinforcement in relation to the tensile strength in the perpendicular direction, varies from 3 to 15, depending on the reinforcing charges, the fiber type and the count.

As seen in FIG. 5a an alternative deformable floor employs a telescoping shaft configuration rather than the one-piece support shafts 13 of the previously discussed embodiments. The telescoping shaft configuration basically includes two end shaft elements 13a which are installed to extend within the interior of a tubular central shaft element 13b. As will be seen, such an embodiment, which allows relative movement between the end shaft elements 13a and the tubular, central shaft element 13b, enables a different form of anchoring means to be provided between the support shaft and the fastening frames 11. Specifically, because variations in the overall length of the telescoping shaft configuration will occur between the end shaft elements 13a and the central shaft element 13b, the ends 15' thereof may be more directly secured to the fastening frame 11. The end 15' may be installed in a rubber base bearing 14a, which is embedded in a housing in the end of the fastening frame 11, in a manner which allows relative rotation between the end 15' and the rubber base bearing 14a without any relative axial movement therebetween.

A number of the rigid transverse bars 10a (those mounted on the end shaft elements 13a) can be mounted on the friction bearings 12 as described for the embodiment of FIGS. 2a and 2b. However, other rigid transverse bars 10b are in contact with and supported by the central shaft element 13b. The central shaft element 13b is itself elastically centered by being rigidly secured to a rigid transverse bar 10c located in the center of the deformable floor.

Because of the capability of relative movement between the end shaft elements 13a and the central shaft element 13b, it is possible to employ a simplified means for supporting the rigid transverse bars 10b on the central shaft element 13b. For example, a simple sliding support bearing 12b which only partially surrounds the circumference of the central shaft element 13b can be employed to perform the same function as the friction bearings 12 of the rigid transverse bars 10a mounted on the end shaft elements 13a. Such a support bearing 12b may, for example, only cover a 90 degree sector at the top or upper surface of the central shaft element 13b. The rigid transverse bars 10b may be provided with an extended portion at the end thereof which does not encircle the central shaft element 13b but only partially overlies one side and upper region thereof. Because of the deformable connection between the end shaft elements 13a and the central shaft element 13b, as will be discussed below, the support bearings 12b need not include the elastic ring material such as that provided for friction bearings 12. However, without some form of resilient mounting, other means should be employed to ensure retention of the support bearings 12b on the central shaft element 13b. For example, the extended portion at the end of the rigid transverse bar 10b may partially surround the central shaft element 13b to prevent it from being lifted or removed from the central shaft element 13b while still providing only contact at the top of the central shaft element 13b during normal operation of the deformable floor. It should also be recognized, that with a proper resilient support, an alternative configuration for the friction bearings generally employed in the preferred embodiment of FIG. 2a could also be constructed to only partially surround the single smooth support shaft 13 thereof.

As mentioned above, the alternative configuration of FIG. 5a includes a means for allowing relative movement between the end shaft elements 13a and the central shaft element 13b. Accordingly, each of the end shaft elements 13a has an interior end thereof remote from the fastening frame 11 which extends through an openings in and is supported by interior bearings 22,23 mounted within the interior of the tubular, central shaft element 13b. The interior bearings 22,23 both include some type of elastic ring material which is capable of being resiliently deflected or deformed to accommodate for relative angular movement between the end shaft elements 13a and the central shaft element 13b. Since, the interior bearing 22 also allows sliding telescoping movement of the end shaft element 13a within the central shaft element 13b, it may be similar to the friction bearings 12 and include an opening therethrough which has an interior surface formed of a material having a low coefficient of friction. On the other hand, the interior bearing 23 would be fixedly secured to the interior end of the end shaft element 13a. Since the interior bearing 23 is intended to slide along the interior of the tubular, central shaft element 13b, the external region thereof is preferably lined with an antifriction material.

Finally, it should be noted that the preferred configuration includes generally even longitudinal spacing between the rigid transverse bars 10a, 10b, and 10c in an undeflected condition between the vehicles. However, the different longitudinal spacing shown in FIG. 5a demonstrates possible deflections that can occur during the operation of the vehicles because of different elasticities of the different elements or different frictional forces therebetween. In either case, the deformable floor continues to accommodate for relative movement between the vehicles while providing continuity at the floors thereof.

As seen in FIG. 5b, another alternative embodiment of the deformable floor can be employed for configurations which would be expected to be subject to only small deflections or relative movements in the longitudinal direction of a support shaft 13'. It is expected that such movement can be absorbed by the deformation of rubber-based bearings 25. The deformable bearings 25 are mounted on the smooth support shaft 13' rather than the friction bearings 12 but may be secured in the same fashion within a housing on the end of the rigid transverse bars 10. Because of the expected limited longitudinal movement, the smooth support shaft 13' can be held at the ends thereof by elastic supports 24 which primarily allow small angular rotations. The elastic supports 24 are respectively mounted on a fastening frame 11' which is, in turn, fastened to the floor framing of the adjacent vehicle by an appropriate means. The elastic supports 24 are capable of absorbing, by shearing, under load, the small variations in the distance between the adjacent vehicles. With such a configuration, unusual compression of the deformable floor would tend to push the array of rigid transverse bars 10 closely together. However, because of the inclusion in the deformable floor of the reinforcement materials 17 and/or 18 and the covering therefore, the overall movement of the array of rigid transverse bars 10 would be limited. Accordingly, the contact produced by the elements within the deformable floor would tend to limit the possible compression of the deformable floor as these elements are entrapped between the ends of the adjacent vehicles. As a result, the maximum sheer deformation of the elastic supports 24 would not exceed any rupture limit, and even unusual compression of such a deformable floor would not be expected to cause any destruction of or damage to the components thereof.

From the embodiments described hereinabove, it should be clear that a number of alternative configurations could be utilized to produce longitudinal deflection or movement of the rigid transverse bars on the support shafts whether a single piece or a telescoping support shaft is employed. It is possible for the sliding movement of the rigid transverse bars on the support shaft to be facilitated by means of friction bearings and by the deformation of elastic end supports between the support shafts and the frames of the vehicles to which they are secured. On the other hand, a similar result can be obtained by the use of deformable elastic rubber-base bearings to mount the rigid transverse bars on the support shafts and by the use of friction bearing to facilitate relative sliding movement of the support shafts on the frames of the vehicles to which they are secured.

Figure 6A:
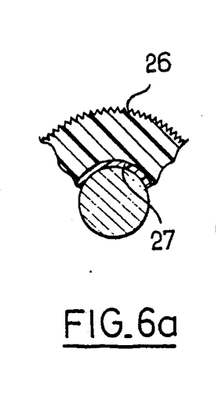
FIGS. 6a and 6b are sectional views of a friction bearing of the type generally shown in FIG. 2.
Figure 6B:
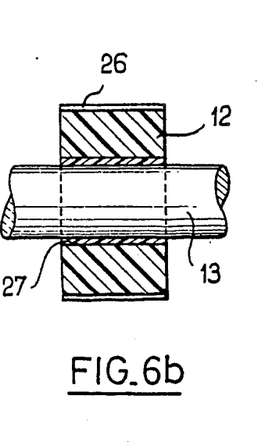
Figure 6C:
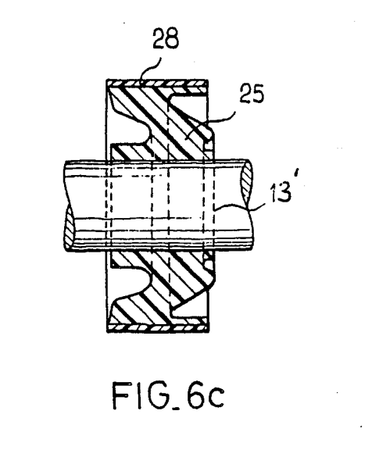
FIG. 6c is a sectional view of a support bearing of the type generally shown in FIG. 5b.

As seen in FIGS. 6a, 6b and 6c some of the bearings discussed hereinabove include features which are particularly adapted for sliding support or deformable support. The elastomer compound of one of the friction bearings 12, as shown in FIGS. 6a and 6b preferably includes grooves or millings in its external surface 26 and is forcefitted into the housing support at the end of the rigid transverse bar. The elastomer compound is also tightly bonded, during vulcanization, to an antifriction ring 27, which is preferably made of polyethylene with a very high molecular weight. The antifriction ring 27 allows the support shaft 13 to be closely received within the opening therethrough. Such a configuration allows relative axial movement between the friction bearing 12 (and thus the end of the rigid transverse bar) and the support shaft 13 by relative sliding of the antifriction ring 27 on the support shaft 13. At the same time, the configuration allows relative angular movement between the end of the rigid transverse bar and the support shaft 13 by resilient deformation of the elastomer compound surrounding the antifriction ring 27 (and thus the support shaft 13) and supported by the housing on the end of the rigid transverse bar 10.

The deformable bearing 25 of FIG. 6c can be made of the same elastomer compound which is preferably secured by adherence to an external ring 28. The external ring 28 is itself made of metal or a plastic material such as, but not limited to, polyamide. The external ring 28 may be force fitted within a bore formed in the bar stock or the polymer material used to form the rigid transverse bars. Mounting in this manner eliminates the need to weld an additional housing or cylindrical ring on the end of the rigid transverse bar to make it even more economical to produce. The support shaft 13' must be forcibly installed within the central opening in the deformable bearing 25 because the tightening of the elastomer compound thereabout. Installation may be facilitated by means of shims to ensure the various rigid transverse bars are maintained in their proper position. Since this configuration can be employed in the embodiment shown in FIG. 5b the flattened ends of the support shafts 13 must also pass through these central openings before they can be positioned in simple contact with the elastic supports 24.

Figure 3:
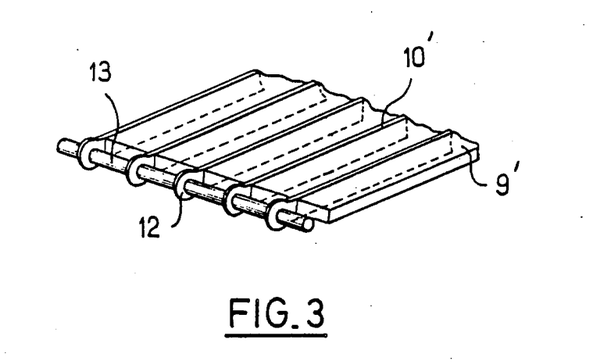
FIG. 3 is a simplified, fragmentary perspective view of one alternative configuration of a deformable floor.

Finally, as seen in FIG. 3 in simplified form, yet another embodiment includes a deformable floor 9' having rigid transverse bars 10' which are straight. Although not shown in detail, they would include friction bearings 12 at the ends thereof which are in alignment with the remainder of the rigid transverse bar 10'. As a result, the smooth support shafts 13 which support them are in the same general plane as the deformable floor 9'. This configuration is lighter and includes a reinforced elastomer compound which does not require any shaping operation at the sides thereof during manufacture. Accordingly, some form of appropriate deformable covers (not shown) would be required to provide a continuous seal with the side walls and the joint of the interconnecting compartment. Although some problems may be experienced in molded parts for these covers, since they would not be expected to support any load, they would not require reinforcement as is required at the sides of the deformable floor 9.

The various embodiments of the invention as described produce different solutions to the problem of supporting the variable loads which can be exerted on the rigid transverse bars as the vehicles pass road crossings or as rolling loads are exerted on the deformable floor. The solutions represent an economical means for providing such a deformable floor in the rail or road vehicle industry.

A preferred method of fabricating the deformable floor includes providing, first of all, a thick, flat wall made of reinforced elastomer compound. The wall is then bent into accordion folds in contact with the rigid transverse bars which have been previously treated to ensure adherence. The entire assembly is then introduced into a mold of appropriate shape to subject it to the vulcanization operation which will ensure, at the same time, the close chemical bonding of the various elements therein.

An additional operation comprises the assembly by embedding or otherwise mounting either friction bearings or deformable bearings in housings located at the ends of the rigid transverse bars.

The deformable floor formed in this manner is then mounted on the support shafts by the various mechanical means described hereinabove which are designed to allow the longitudinal deflection or movement of the rigid transverse bars.

A number of patents disclose the formation of deformable elements including elastomer material with reinforcing elements therein as follows: U.S. Pat. No. 4,146,415, entitled "Process For Manufacturing Tires"; U.S. Pat. No. 4,187,349, entitled "Bonding Of Rubber To Reinforcing Elements"; U.S. Pat. No. 4,278,726, entitled "Energy Absorbing Elements Comprising Rigid Non-Elastomeric Layer And ViscoElastic Layer With Twisted Fiber Bundles Embedded Therein; U.S. Pat. No. 4,308,093, entitled "High Temperature Resistant Compressible Sheet Material For Gasketing And The Like"; and U.S. Pat. No. 4,511,619, entitled "Sealing Sheet Of Elastomeric Synthetic Resins With Textile Reinforcement On Outer Layer".

Additional patents disclose different means for interconnecting relatively moveable adjacent railway or road vehicles as follows: U.S. Pat. No. 4,191,107, entitled "Articulated Railway Car"; U.S. Pat. No. 4,233,909, entitled "Railway Car Assembly Composed Of A Series Of Articulately Interconnecting Cars"; U.S. Pat. No. 4,244,297, entitled "Articulated Railway Car Trucks"; and U.S. Pat. No. 4,690,067, entitled "Device For Interconnecting A Portal Passageway Between Two Rail Vehicles".

All of the above-mentioned patents are hereby expressly incorporated by reference as if the contents thereof were set forth in full herein.

Those skilled in the rail or road vehicle field can, of course, make various alterations or modifications or combine the various features described without departing from the scope of the invention as claimed. The invention as described hereinabove in the context of a preferred embodiment is not to be taken as limited to all of the provided details thereof, since modifications and variations thereof may be made without departing from the spirit and scope of the invention.

What is claimed is:

1. A deformable floor for pedestrian and other traffic thereacross for being disposed between adjacent end frame means of two adjacent rail or road vehicles at the floors thereof, said deformable floor for use with flexible means, said flexible means for interconnecting said adjacent vehicles, said deformable floor for allowing relative movement between said adjacent end frame means and also for accommodating differences in relative angular positioning of and linear distances between said adjacent end frame means, said deformable floor comprising:

support shaft means extending in a longitudinal direction generally between said adjacent end frame means;
a plurality of spaced rigid transverse members extending transversely of said longitudinal direction;
means for mounting said support shaft means to said adjacent end frame means to provide relative angular movement therebetween;
means for supporting each of said rigid transverse members on said support shaft means to provide relative longitudinal movement therebetween;
deformable material being disposed between said rigid transverse member;
said floor having an upper portion and a lower portion;
said upper portion having a surface disposed upwardly;
said upwardly disposed surface being for pedestrian or other traffic thereacross; and
said deformable material forming at least a part of said upper portion.

2. A deformable floor for pedestrian or other traffic thereacross for being disposed between adjacent end frame means of two adjacent rail or road vehicles at the floors thereof, said deformable floor for use with flexible means, said flexible means for interconnecting said adjacent vehicles, said deformable floor for allowing relative movement between said adjacent end frame means and also for accommodating differences in relative angular positioning of and linear distances between said adjacent end frame means, said deformable floor comprising:

support shaft means extending in a longitudinal direction generally between said adjacent end frame means;
a plurality of spaced rigid transverse members extending transversely of said longitudinal direction;
means for mounting said support shaft means to said adjacent end frame means to provide relative angular movement therebetween;
means for supporting each of said rigid transverse members on said support shaft means to provide relative longitudinal movement therebetween;
reinforcing material being disposed about and adhering to each of said rigid transverse members;
an upper covering of elastomer material being disposed on said rigid transverse members and said reinforcing material to provide a generally planar surface thereabove which is generally alignable between said floors of said adjacent vehicles;
a lower covering of elastomer material being disposed on said reinforcing material;
said floor having an upper portion and a lower portion;
said upper portion having a surface disposed upwardly;
said upwardly disposed surface including said upper covering and being for pedestrian or other traffic thereacross; and
said reinforcing material forming at least a part of said upper portion.

3. A deformable floor for pedestrian or other traffic thereacross for being disposed between adjacent end frame means of two adjacent rail or road vehicles at the floors thereof, said deformable floor for use with flexible means, said flexible means for interconnecting said adjacent vehicles, said deformable floor for allowing relative movement between said adjacent end frame means and also for accommodating differences in relative angular positioning of and linear distances between said adjacent end frame means, said deformable floor comprising:

at least two support shafts;
each of said support shafts being located at opposite sides of said adjacent end frame means;

said each of said support shafts having extended ends and extending in a longitudinal direction generally between said adjacent end frame means;

each of said rigid transverse bars extending in a transverse direction between said support shafts;

means for resiliently mounting each said extended end of said support shafts to said adjacent end frame means to provide relative angular movement therebetween;

means for supporting each end of at least some of said rigid transverse bars respectively on each of said support shafts to provide relative longitudinal movement between said each end of at least some of said rigid transverse bars and said each of said support shafts;

reinforcing material being disposed about and adhering to said each of said rigid transverse bars;

an upper covering of elastomer material being disposed on said rigid transverse bars and said reinforcing material to provide a generally planar surface thereabove which is generally alignable between said floors of said adjacent vehicles;

a lower covering of elastomer material being disposed on said reinforcing material;

said floor having an upper portion and a lower portion;

said upper portion having a surface disposed upwardly;

said upwardly disposed surface including said upper covering and being for pedestrian or other traffic thereacross; and said reinforcing material forming at least a part of said upper portion.

4. The deformable floor according to claim 3, wherein said lower covering of elastomer material includes a generally accordion shape about said rigid transverse bars and said reinforcing material.

5. The deformable floor according to claim 4, wherein said reinforcing material is formed in a first layer and a second layer, said first layer directly adheres to said each of said rigid transverse bars and said lower covering is bonded to said second layer.

6. The deformable floor according to claim 5, wherein said first layer of said reinforcing material includes first cord elements oriented in a first direction, said second layer of said reinforcing material includes second cord elements oriented in a second direction, and said first direction and said second direction are generally symmetrical with respect to said longitudinal direction and said transverse direction.

7. The deformable floor according to claim 6, wherein said first cord elements and said second cord elements are respectively made from a group consisting of textile material, metal material, and aramid material.

8. The deformable floor according to claim 3, wherein said upper covering and said lower covering are formed with said plurality of said rigid transverse bars and said reinforcing material therebetween by molding under pressure.

9. The deformable floor according to claim 3, wherein said means for resiliently mounting each said extended end of said support shaft includes a pair of fastening frame means which are generally parallel to said rigid transverse bars, each of said fastening frame means is respectively located between said plurality of said rigid transverse bars and one of said adjacent end frame means to be rigidly joined to said one of said adjacent end frame means, said reinforcing material is adhering to said fastening frame means, said upper covering of elastomer material is bonded to said fastening frame means, said each of said fastening frame means has a resiliently deformable bearing at each end thereof, and said extended end of said support shaft is mounted within said resiliently deformable bearing.

10. The deformable floor according to claim 9, wherein said resiliently deformable bearing has a central opening for closely receiving said extended end of said support shaft therein and said central opening has an internal surface having a relatively low coefficient of friction to allow relative longitudinal movement of said extended end of said support shaft therein.

11. The deformable floor according to claim 3, wherein said means for supporting said end of said rigid transverse bar on said support shaft for relative longitudinal movement therebetween includes friction bearing means which at least partially surrounds said support shaft for sliding contact therebetween and said friction bearing means includes an internal contact surface having a relatively low coefficient of friction.

12. The deformable floor according to claim 11, wherein said means for supporting includes resiliently deformable material at least partially surrounding said friction bearing means to allow angular movement between said support shaft and said end of said rigid transverse bar thereon.

13. The deformable floor according to claim 12, further including means for preventing said relative longitudinal movement between said support shafts and at least one of said rigid transverse bars located generally centrally within said plurality of said rigid transverse bars to limit said relative longitudinal movement between said support shafts and the other said rigid transverse bar of said plurality.

14. The deformable floor according to claim 3, wherein said means for supporting said end of said rigid transverse bar on said support shaft for relative longitudinal movement therebetween includes a resiliently deformable fitting having an outer region and a central opening, said resiliently deformable fitting is mounted at said outer region to said end of said rigid transverse bar, said support shaft is disposed within said central opening to prevent any relative sliding movement therebetween, and said relative longitudinal movement is produced by shear deformation of said resiliently deformable fitting between said central opening and said outer region.

15. The deformable floor according to claim 14, wherein said resiliently deformable fitting is capable of angular deformation between said opening and said outer region to allow relative angular movement between said support shaft and said end of said rigid transverse bar thereon.

16. The deformable floor according to claim 3, wherein said means for resiliently mounting said each said extended end of said support shaft to said adjacent end frame means for said relative angular movement therebetween is capable of allowing relative longitudinal movement therebetween.

17. The deformable floor according to claim 3, wherein said each of said support shafts includes at least two longitudinally extending shaft elements, said shaft elements are joined at adjacent overlapping ends thereof for relative longitudinal movement therebetween, and said each said end of at least a portion of said plurality of said rigid transverse bars is supported by a corresponding one of said shaft elements.

18. The deformable floor according to claim 3, wherein said each of said support shafts and said each of said rigid transverse bars are respectively made of a material from a group consisting of metal, homogenous polymer material and composite polymer material.

19. The deformable floor according to claim 3, wherein reinforcing layers are composed of said elastomer material with -in situ- an additional reinforcing material therein comprising short, oriented fibers, which make them anisotropic.

20. The deformable floor according to claim 3, wherein at least one of said upper covering and said lower covering includes said elastomer material thereof which is formulated to make it resistant to fire.

21. The deformable floor according to claim 3, wherein at least one of said upper covering and said lower covering includes as its base material an elastomer which has in its molecular chain at least one of chlorine atoms and bromine atoms and is selected from a group consisting of polychloroprene, chlorinated butyl rubber, brominated butyl rubber, and chlorinated polyethylene.

22. The deformable floor according to claim 3, wherein said upper covering includes wedges of elastomer material at an upper portion of said each of said rigid transverse bars to improve adherence between said each of said rigid transverse bars and said reinforcing material.

* * * * *

UNITED STATES PATENT AND TRADEMARK OFFICE
CERTIFICATE OF CORRECTION

PATENT NO. : 4,905,607

DATED : March 6, 1990

INVENTOR(S) : Roland M. WANNEROY

It is certified that error appears in the above-identified patent and that said Letters Patent is hereby corrected as shown below:

In column 2, line 45, delete "adJacent", and insert --adjacent--.

In column 2, line 62, after "vehicles" insert --.--.

In column 11, line 65, delete "filler", and insert --fillers--.

In column 19, line 3, after "between said adjacent end frame means;", please insert the following:
--a plurality of spaced rigid transverse bars;--.

Signed and Sealed this

Seventh Day of May, 1991

*Attest:*

HARRY F. MANBECK, JR.

*Attesting Officer*  *Commissioner of Patents and Trademarks*